United States Patent
Cardi

(10) Patent No.: US 8,058,555 B2
(45) Date of Patent: Nov. 15, 2011

(54) CONDUCTOR RACEWAY SEPARATOR

(75) Inventor: Carl V. Cardi, Newark, OH (US)

(73) Assignee: CVC Limited 1 LLC, Lebanon, OH (US)

( * ) Notice: Subject to any disclaimer, the term of this patent is extended or adjusted under 35 U.S.C. 154(b) by 0 days.

(21) Appl. No.: 12/631,886

(22) Filed: Dec. 7, 2009

(65) Prior Publication Data

US 2010/0084189 A1 Apr. 8, 2010

Related U.S. Application Data

(63) Continuation of application No. 11/437,303, filed on May 19, 2006, now Pat. No. 7,635,812.

(51) Int. Cl.
*H01B 7/06* (2006.01)

(52) U.S. Cl. .......... 174/72 A; 174/68.1; 174/68.3; 174/72 C; 174/95; 174/97; 439/207; 52/220.5; 52/220.7

(58) Field of Classification Search .......... 174/480, 174/481, 68.1, 68.3, 72 A, 72 C, 75 R, 95, 174/97, 96, 135, 101; 439/207; 248/205.1, 248/68.1; 52/220.1, 220.5, 220.7; 362/149, 362/220; 385/134, 135
See application file for complete search history.

(56) References Cited

U.S. PATENT DOCUMENTS

| | | | |
|---|---|---|---|
| 594,998 A | 12/1897 | Lyle | |
| 1,132,676 A | 3/1915 | Murray et al. | |
| 3,524,477 A | 8/1970 | Steger, Jr. | |
| 3,821,688 A | 6/1974 | Larsile | |
| 4,374,881 A | 2/1983 | Hamilton | |
| 4,570,883 A | 2/1986 | Wepfer | |
| 4,646,211 A | 2/1987 | Gallant et al. | |
| 4,729,409 A | 3/1988 | Paul | |
| 4,907,767 A | 3/1990 | Corsi et al. | |
| 4,962,639 A | 10/1990 | Blase | |
| 5,036,891 A | 8/1991 | Vogelsang | |
| 5,274,194 A * | 12/1993 | Belcher | 174/97 |
| 6,079,134 A | 6/2000 | Beshah | |
| 6,448,497 B1 | 9/2002 | McCracken et al. | |
| 6,580,867 B2 | 6/2003 | Galaj et al. | |
| 6,706,969 B1 | 3/2004 | Young | |
| 6,953,896 B2 * | 10/2005 | Kleeberger et al. | 174/68.1 |
| 7,345,239 B2 * | 3/2008 | Tousignant et al. | 174/68.1 |
| 7,635,812 B2 * | 12/2009 | Cardi | 174/68.1 |

* cited by examiner

*Primary Examiner* — Angel R Estrada

(74) *Attorney, Agent, or Firm* — Jason H. Foster; Kremblas & Foster

(57) ABSTRACT

A divider for keeping current-carrying conductors separated transversely in raceways, such as walker ducts and cable trays, in which multiple conductors extend, in order that air can flow around the conductors and cool the conductors. The divider is mounted in the raceway to form passages through which some of the conductors can extend spaced from other conductors. Two separators are mounted together and preferably mounted to the raceway sidewall, forming at least a base passage between the separator and the sidewall of the raceway, and an elevated passage between the walls of the separators.

14 Claims, 3 Drawing Sheets

CONDUCTOR RACEWAY SEPARATOR

CROSS-RFERENCES TO RELATED APPLICATIONS

This application is a continuation of U.S. patent application Ser. No. 11/437,303 filed May 19, 2006, issued as U.S. Pat. No. 7,635,812.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to raceways for current-carrying conductors, and more particularly to a divider for separating current-carrying conductors in a raceway for cooling.

2. Description of the Related Art

It is known to use protective sheathing, such as metal or plastic conduit, to enclose a current-carrying conductor that extends through walls, ceilings and floors between a receptacle and a circuit panel. Conduit is used to protect the conductor from heat, abrasion and impact that could burn, wear or cut through the insulation layer on the exterior of the conductor. If the insulation layer is breached, the conductor is likely to short circuit through another conductor, such as another wire, a circuit panel or a person.

It is also known to enclose multiple conductors in raceways that can also be enclosed within the walls, ceilings and floors of buildings, in addition to extending along open walls of commercial and industrial buildings, in ducts (e.g., walker ducts) in the floors of such buildings and within underground ducts. By extending multiple conductors through the same raceway, many conductors can be enclosed by a single protective cover, thereby saving material and labor costs in constructing the electrical connections. Such large raceways also permit the addition of conductors after the original construction, thereby saving on the costs of future expansion.

Individual conductors generate heat according to known principles of physics, but single conductors can generally cool fast enough by exposure to air around the conductor to prevent significant thermal breakdown of the insulation. However, when many conductors are crowded into a raceway and seat against one another, the heat generated cannot be removed rapidly enough. The temperature can increase enough to cause thermal breakdown of the insulation. Therefore, electrical codes place limitations on the number of conductors that can be placed in raceways to prevent such thermal breakdown. However, these codes often restrict the number of conductors in a raceway to a small portion of the vacant space in a raceway. For example, ratings dictate how many wires can be in a raceway of a particular size and capacity. Some ratings require that raceways be only 20 percent full or contain no more than 30 current-carrying conductors.

In order to avoid losing space that otherwise goes unused, electrical contractors, especially those who are adding conductors to an existing raceway, place objects between the conductors to space the conductors and permit cooling by air circulation. Typical of such objects include blocks of wood (although combustible materials are not generally permitted in raceways), wire ties screwed to a sidewall of the raceway and similar structures that are not convenient, efficient or safe. The prior art includes other devices that attempt to create spaces between the conductors. However, the prior art devices have disadvantages that make them undesirable.

U.S. Pat. No. 4,962,639 to Blase discloses a multi-passage subdivider for chain links. Space is formed around the wires by dove-tailed partition walls that are especially designed for particular positions. The sizes and shapes of the components and compartments vary.

U.S. Pat. No. 6,706,969 to Young discloses a cable spacing device for low voltage cables that is limited to a few rows of divided wire passages. Additionally, the dividers can be inserted in only one end of the device, thereby making it applicable for very few conductor raceways.

U.S. Pat. No. 4,570,883 to Wepfer discloses a very complex arrangement of plates for separating spaced tubes. The emphasis in this structure is on the resilient parts of the supports, and the device is not modular in the same direction as the tubes, but in the direction that is perpendicular to the orientation of the tubes. This prevents the addition of more spacers after the tubes are in place.

Therefore, the need exists for a raceway divider that permits cooling of the conductors placed therein, that is readily installed in virtually any conductor raceway, and that can be installed in existing raceways with conductors.

BRIEF SUMMARY OF THE INVENTION

The invention is a conductor separator in combination with a conductor raceway having at least one sidewall. The combination comprises first and second separators mounted together forming a plurality of intersecting walls. An elevated passage is formed between the plurality of walls and a base passage is formed between the sidewall and at least one of the walls. The first separator seats against the raceway sidewall and can be mounted to the sidewall. A first conductor extends through the elevated passage and seats against at least one of the walls of the separator and a second conductor extends through the base passage and seats against the raceway sidewall. A gap is formed between the conductors through which cooling fluid can flow.

In a preferred embodiment, the first separator is substantially identical to the second separator and the separators mount together at the intersections of the walls. In a still more preferred embodiment, the first separator is mounted to the sidewall. The separators are preferably removably mounted to one another to permit modular attachment of one separator to the other, with the possible addition of numerous other separators to either separator.

In one embodiment, the walls are perforated to permit cooling fluid to flow through the perforations. In a preferred embodiment, the separators are made up of walls connected at opposite edges to adjacent walls that are angled relative thereto. This configuration thereby forms pleats, and at least one slot is formed at the angled intersection of one pair of adjacent walls in the first separator into which a finger at the angled intersection of one pair of adjacent walls in the second separator is inserted.

It is also contemplated that the invention includes a method of combining a conductor separator with a conductor raceway having at least one sidewall. The method comprises mounting together first and second separators to form a plurality of intersecting walls. The elevated passage is formed between the plurality of walls and at least a base passage between the sidewall and at least one of the walls. The first separator seats against the raceway sidewall. The method includes the steps of extending at least a first conductor through the elevated passage against one of said walls and extending a second conductor through the base passage against the raceway sidewall, thereby forming a gap between the conductors through which cooling fluid can flow. The step of extending the conductors through the passages includes forming the passages around the conductors, such as by passing the separators between conductors and then attaching the separators together.

The invention permits one to put as many conductors in the same raceway as possible, and permits those conductors to be separated transversely for cooling. The structures that make up the invention are removably mounted to one another so that they can be assembled without the need to restring the conductors through the passages, and then disassembled if there is no longer a need for such structures in the raceway. The invention is modular, and units can be added without regard to limitations other than space.

Figure 1:
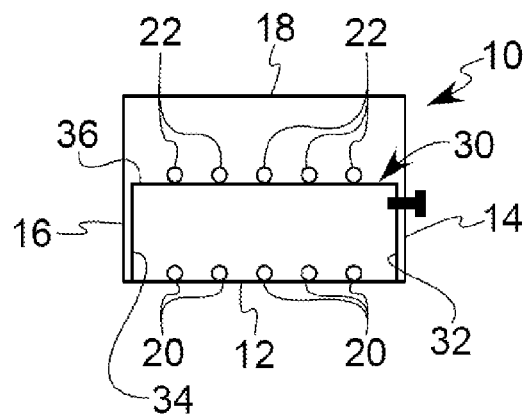
FIG. 1 is a schematic end view illustrating an embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

The invention is illustrated in a fundamental form in FIG. 1, in which a raceway 10 is shown. The term "raceway" is used herein to describe a structure in which multiple current-carrying conductors are housed. Thus, raceways include, but are not limited to, walker ducts, cable trays, metallic and nonmetallic wire ways, auxiliary gutters and cellular ducts. Of course, other terms can be used for structures similar to these, all of which are included under this term.

The raceway 10 is a conventional structure, and is shown in FIG. 1 schematically in cross section having sidewalls 12, 14, 16 and 18. The lower sidewall 12 supports the current-carrying conductors 20 in a conventional manner. The device shown in FIG. 1 has a separator 30 supported by the sidewall 12 upon which the current-carrying conductors 22 rest. The separator 30 has legs 32 and 34 that are connected at their upper ends by the wall 36. The lower ends of the legs 32 and 34 are supported by the sidewall 12 of the raceway, and the wall 36 supports additional current-carrying conductors 22 with a gap between the conductors 20 and the conductors 22.

Figure 2:
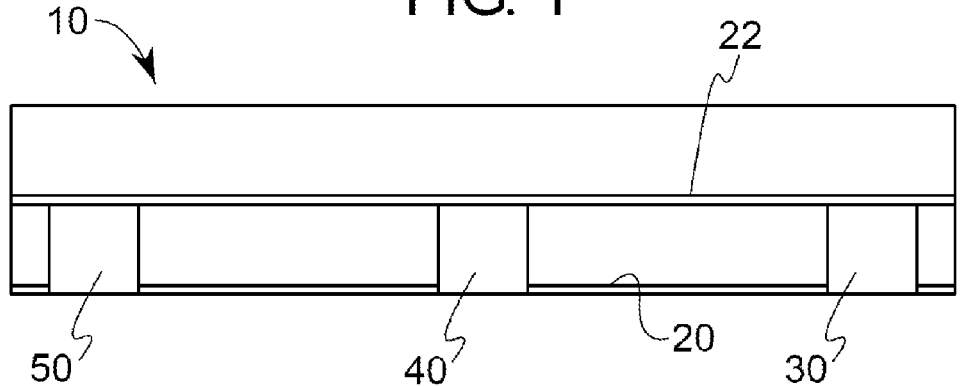
FIG. 2 is a schematic side view illustrating the embodiment of FIG. 1.

The separator 30 is one of many separators in the raceway 10. As shown in FIG. 2, at least two other separators 40 and 50 are mounted in the raceway 10 to support the conductors 22 over the conductors 20. By spacing the separators from one another along the length of the conductors 20 and 22, fluid, including a liquid or a gas, can flow across and between the conductors 20 and 22 in order to cool the conductors and prevent thermal breakdown of the insulation thereon. Preferably, air is the fluid that flows across and between the conductors 20 and 22 to cool them. Air can flow longitudinally along the conductors and transversely between the conductors 20 and 22, because the conductors are exposed on many sides to air in the raceway 10. Because heat rises, and because raceways often align conductors horizontally, transverse air currents are caused by the air in the raceways rising as it is heated by the conductors. By creating longitudinal (along the length of the conductors) gaps between the separators, transverse air flow is permitted to cool the conductors on the separators.

Figure 3:
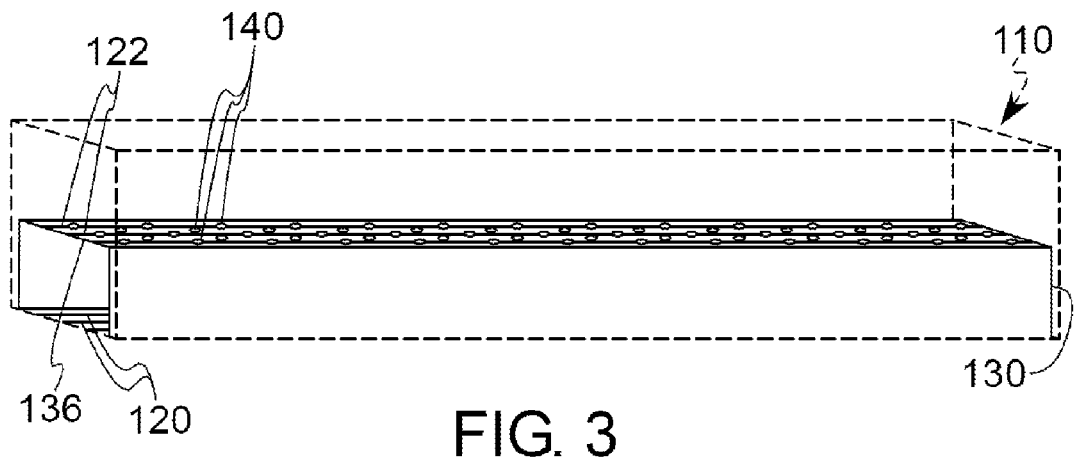
FIG. 3 is a schematic view in perspective illustrating an alternative embodiment of the invention.

A similar result could arise with the invention if the separators were not spaced apart along the length of the conductors, as long as a modification is made to the separator. As an example, in the embodiment shown in FIG. 3, the raceway 110 is a conventional raceway with conductors 120 extending longitudinally along the bottom sidewall of the raceway 110. The separator 130 extends the length of the raceway 110 and has a wall 136 supported above the sidewall of the raceway 110. The wall 136 supports additional conductors 122 that extend along the length of the raceway 110 spaced from the conductors 120. The separator 130 has perforations 140 through the wall 136 to permit air flow between the conductors 120 and 122. Preferably the perforations 140 are of a size that permits unrestricted air flow through them, such as greater than about one-eighth of an inch. Of course, the separator 130 could be made of screen or other configurations with perforations smaller than one-eighth of an inch, but which are so prevalent that air flow therethrough is substantially unrestricted.

Although the separator 130 is not discontinuous along the length of the conductors 120 and 122 as with the FIG. 1 embodiment, the perforations 140 permit air flow transverse to the conductors in place of the longitudinal gaps between the separators 30, 40 and 50 of the FIG. 1 embodiment. The embodiment of FIG. 3 would be suitable for use in long raceways, such as walker ducts and cable trays, whereas the embodiment of FIG. 1 would be more suited to wire-ways, which have wires crossing one another, because the shorter separators provide more flexibility in conductor direction changes. The perforations 140, if sufficiently large in diameter, would permit conductors to pass transversely through a long separator at any point along its length.

Figure 4:
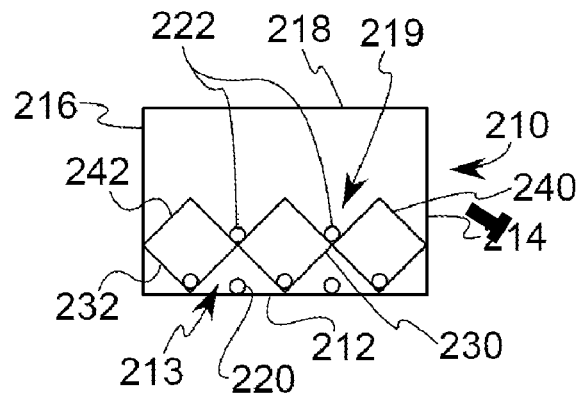
FIG. 4 is a schematic end view illustrating another embodiment of the present invention.

The embodiment of FIG. 4 is a somewhat more complex, although somewhat more efficient, embodiment of the present invention. The raceway 210 is a conventional raceway having sidewalls 212, 214, 216 and 218. The conductors 220 rest upon the sidewall 212 of the raceway and extend the length thereof. The separator 230 rests upon the sidewall 212 and mounts to another separator 240. The separators 230 and 240 are made of a plurality of intersecting planar walls, such as the walls 232 and 242, that join at angled intersections at the opposite sides of each wall. The walls of the separators 230 and 240 are approximately two inches square.

Figure 5:
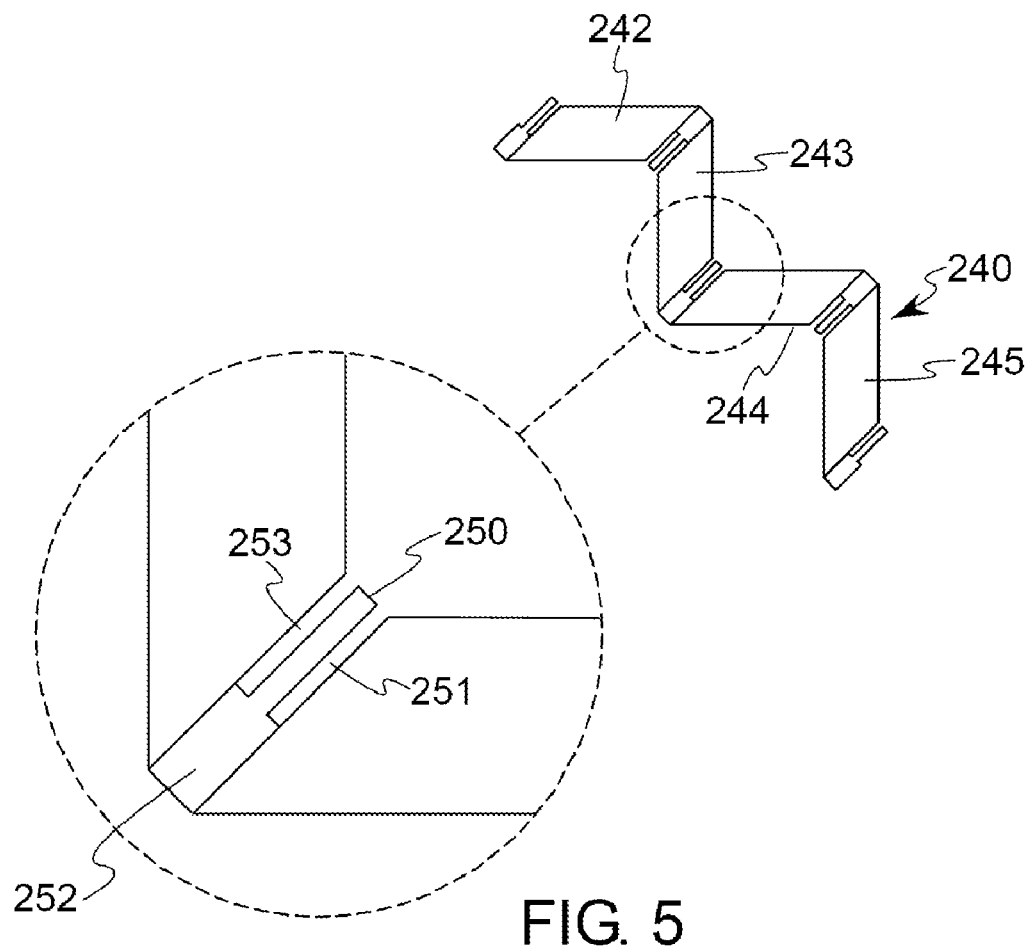
FIG. 5 is a view in perspective illustrating a contemplated divider used in the invention, and a magnified view of a particular component of the divider.

The separator 240 is shown in FIG. 5 having the planar walls 242, 243, 244 and 245 that join each other at angled intersections to form a "pleated" structure. At each intersection of two walls, there is a connector that is shown more clearly in the enlarged portion of the FIG. 5 illustration. The connector includes a finger 250 extending from a panel 252. Two slots 251 and 253 are formed on opposite sides of the finger 250. A connector essentially identical to this structure is formed at every intersection of two walls, and the finger of each such connector alternates in the direction it points from one intersection to the next adjacent intersection. Every other intersection has a finger pointed in one direction, and every other intersection has a finger pointing in the opposite direction. Thus, when two separators are placed with their intersecting walls adjacent one another, the finger of each intersection extends beyond the oppositely directed finger of the mating intersection, and, in order to align the separators, the separators are displaced until the fingers extend over the panels and the panels are in the slots. Therefore, the two separators are rigidly mounted together at every intersection of the walls.

The separators that support the conductors in the FIG. 4 embodiment are spaced along the length of the conductors from other separators as in the FIG. 2 embodiment. Such a configuration forms a plurality of aligned and longitudinally spaced passages through which conductors extend in order that the spaced walls of the passages can support the conductors at spaced intervals. For example, in the embodiment of FIG. 4, there are conductors 220 resting upon the sidewall 212 in a conventional manner in the base passage 213 that is formed between the walls of the separator 230 and the sidewall 212. Additionally, there are conductors 222 resting in the elevated passage 219 formed between the walls of the separator 240. Thus, the conductors 220 and 222 are separated from one another by a transverse gap through which air can flow to cool the conductors. Likewise, because the separators 230 and 240 are spaced longitudinally from the next longitudinally adjacent separator, air can flow longitudinally along the conductors to cool them as well. If desired, the separators shown in FIGS. 4 and 5 can be extended the length of the raceway as in the FIG. 3 embodiment, and perforated in order to permit transverse air flow.

Each of the separators in the FIG. 4 embodiment is preferably substantially identical to every other separator, thereby reducing the number of components to be manufactured, and simplifying installation. Additionally, the separators are modular by virtue of the fact that each separator has connectors on all exposed corners, meaning that a separator can be added to existing separators within a raceway so that conductors can be added to the raceway spaced from existing conductors. The only limit to the number of conductors that can be added to an existing raceway separator is the size of the raceway chamber.

The separator embodiment shown in FIGS. 4 and 5 can be installed around existing conductors without detaching the ends of the conductors. Each separator can be extended between two or more parallel conductors and mounted to the sidewall of the raceway and/or another separator to form the desired passages without the need to pass the conductors' ends through the passages formed by the attached separators. The separators form the enclosed passages through which the conductors extend by forming the walls around the conductors, not by forming the walls and then extending the ends of the conductors through the passages between the walls.

The specific structures and connectors described above are not the only ones that can embody the invention. Instead, many other structures that accomplish the purpose of the invention will become apparent to the person having ordinary skill from the description herein. Any structure that forms walls separated to form passages through which conductors can extend, and which permit the flow of air transversely and longitudinally will accomplish this purpose. The materials used can vary from those described, as will become apparent from the description herein to a person having ordinary skill.

Figure 6:
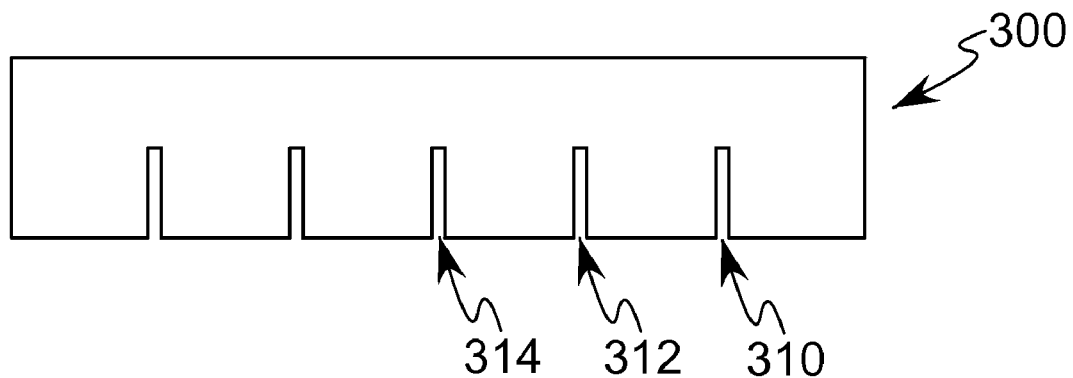
FIG. 6 is a side view illustrating an alternative embodiment of a raceway divider.
Figure 7:
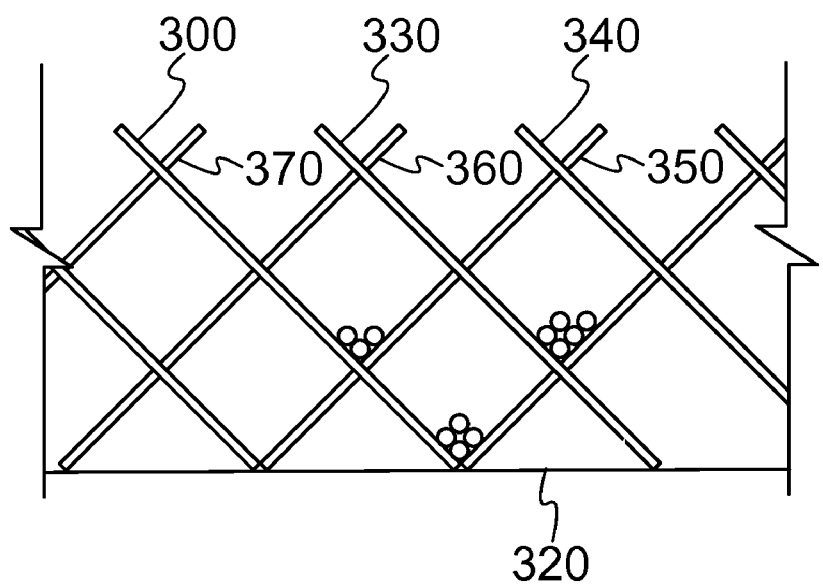
FIG. 7 is an end view illustrating a plurality of the dividers shown in FIG. 6 assembled in a raceway.

As another example of the invention, it is contemplated to form a panel 300 as shown in FIG. 6, having slots, such as the slots 310, 312 and 314, formed therein. The panel can be, for example, galvanized steel sheet metal 18 inches long by four inches wide by one-eighth inch thick. The slots can be about two and one-quarter inches long. Multiple such panels can be installed in a raceway, such as a walker duct shown in FIG. 7 having a lower sidewall 320. The panels 300, 330 and 340 are aligned parallel to one another with their slots facing the same direction, and the panels 350, 360 and 370 are aligned substantially parallel to one another, and substantially perpendicular to the panels 300, 330 and 340. The slots of the panels 350, 360 and 370 are aligned in the opposite direction, facing the slots in the panels 300, 330 and 340. The facing slot of each of the panels aligns with, and in, a corresponding slot of another panel and then the panels are displaced toward one another until the parts of the panels beyond the slots are inserted into the slots, thereby locking the panels together. Conductors can be extended through the passages formed in this structure as shown in FIG. 7, or the FIG. 7 embodiment can be constructed around existing conductors. The conductors are shown in phantom in FIG. 7 in clusters of more than one, in order to illustrate that more than one conductor can be supported in each passage by each separator. Indeed, the invention should be constructed to support at least as many conductors as the electrical code permits.

If the panels are conductive, such as steel, aluminum, copper or any alloys of these or other metals, it may be necessary to electrically connect them together, due to the requirement that all conducting components in a raceway be grounded. This could be accomplished by a tight fit between the panels, or by fasteners extending from one panel to the next adjacent panel. It is also contemplated that the separators of the present invention are fastened to the sidewall of the raceway in which they are contained if the separators are conductive. This can be accomplished using sheet metal screws, rivets, or any special-purpose structure mounted to the sidewall of the raceway. Of course, non-conductive materials can be used to form the structures of the invention, including plastics, such as poly vinyl chloride (PVC), ceramics and composites, such as fiberglass.

It should also be understood that additional components can be added to the above embodiments. This includes other structures that enhance the strength or ease of use of the invention. For example, it is contemplated to form perforations in the ends of walls that permit "punch-out"-like tabs to be bent out at the ends of the walls between the perforations to form supports at the intersections of the walls. These supports keep the conductors from rolling into sharp corners, if necessary, and form a strong brace at each intersection that provides triangulation to prevent racking of the separators. Such tabs also provide a spring-loaded electrical connector between the walls, thereby enhancing grounding of the separators.

The process of installing the embodiment shown in FIGS. 4 and 5 is determined first by whether the conductors are already in the raceway. If not, the separators are simply fastened together and installed in the raceway. Next, the separators are mounted to one of the sidewalls, and then the conductors are extended through the passages in the device. If the conductors are already in the raceway, a first separator 230 is "woven" between the conductors 220 and 222 and mounted to the sidewall 212, such as by a sheet metal screw. Next, the separator 240 is extended between the conductors 220 and 222, and attached to the separator 230 as described above. The conductors 222 are then placed against the walls of the separator 240 spaced transversely from the conductors 220 to permit air to flow through the gap between the conductors. If additional conductors are going to be added, another separator can be mounted to the separator 240 to create new passages defined by walls of the separators.

The embodiments of the invention are shown extending entirely across the width of the raceway, although this is not necessary. Furthermore, although the embodiments shown are described as able to be installed after conductors are already installed in the raceway, the invention is capable of being installed in the raceway and then have the conductors strung through the passages.

While certain preferred embodiments of the present invention have been disclosed in detail, it is to be understood that various modifications may be adopted without departing from the spirit of the invention or scope of the following claims.

The invention claimed is:

1. A conductor separator in combination with a conductor raceway having a floor and opposing sidewalls forming a raceway passage that is significantly longer than wide, through which at least a first conductor and a second conductor extend longitudinally, and in which there is lateral space for a plurality of other conductors to extend, the combination comprising:
   (a) at least a first separator wall and a second separator wall extending laterally and contiguously between the raceway sidewalls to form first and second conductor-supporting surfaces, respectively, that align substantially along a longitudinal line and divide the raceway passage into an elevated passage and a base passage, the first and second separator walls being longitudinally spaced within the raceway passage for allowing cooling fluid to flow laterally through a longitudinal gap between the first and second separator walls; and
   (b) at least the first conductor extending longitudinally through the elevated passage and seating against the first and second conductor-supporting surfaces, at least the second conductor extending longitudinally through the base passage and seating against the raceway floor and a lateral gap is formed between the first and second conductors through which cooling fluid can flow laterally and longitudinally.

2. The combination in accordance with claim 1, wherein the first separator wall is substantially identical to the second separator wall.

3. The combination in accordance with claim 2, wherein a third separator wall and a fourth separator wall mount to the first and second walls at intersections of the separator walls.

4. The combination in accordance with claim 2, wherein the first and second separator walls are mounted to the raceway sidewalls.

5. The combination in accordance with claim 4, further comprising at least one electrical connector mounted to the separator walls.

6. The combination in accordance with claim 5, wherein the separator walls are electrically conductive.

7. A method of combining a conductor separator with a conductor raceway having a floor and opposing sidewalls forming a raceway passage that is significantly longer than wide, through which at least a first conductor and a second conductor extend longitudinally, and in which there is lateral space for a plurality of additional conductors to extend, the method comprising:
   (a) extending first and second separator walls laterally and contiguously between the raceway sidewalls, the first separator wall having a conductor-supporting surface that aligns substantially along a longitudinal line to divide the raceway passage into an elevated passage and a base passage, and longitudinally spacing the first and second separator walls for forming a longitudinal gap between the separator walls and allowing cooling fluid to flow laterally through the longitudinal gap;
   (b) seating the first separator wall against said raceway sidewalls;
   (c) extending the first conductor through the elevated passage and seating the first conductor against the first and second conductor-supporting surfaces; and
   (d) extending the second conductor through the base passage and seating the second conductor against the raceway floor, thereby forming a gap between the first and second conductors through which cooling fluid can flow laterally and longitudinally.

8. The method in accordance with claim 7, further comprising electrically connecting the first separator wall to the second separator wall.

9. The method in accordance with claim 7, further comprising electrically connecting the first separator wall to the raceway sidewall.

10. A conductor separator in combination with a conductor raceway having a floor and opposing sidewalls forming a raceway passage that is significantly longer than wide, through which at least a first conductor and a second conductor extend longitudinally, and in which there is lateral space for a plurality of additional conductors to extend, the combination comprising:
   (a) a separator wall extending laterally and contiguously between the raceway sidewalls, the separator wall having a conductor-supporting surface that divides the raceway passage into a base passage between a first side of the separator wall and the raceway floor and an elevated passage between a second side of the separator wall and the raceway sidewalls; and
   (b) the separator wall seating against said raceway sidewalls;
      wherein at least the first conductor extends longitudinally through the elevated passage and seats against the conductor-supporting surface of the separator wall, at least the second conductor extends longitudinally through the base passage and seats against the raceway floor and a lateral gap is formed between the first and second conductors through which cooling fluid can flow laterally and longitudinally, and wherein the conductor-supporting surface of the separator wall is perforated to permit cooling fluid to flow longitudinally through the passages and laterally through the perforations in the conductor-supporting surface between the elevated passage and the base passage.

11. The combination in accordance with claim 10, wherein the separator wall is mounted to the raceway sidewalls.

12. The combination in accordance with claim 11, further comprising at least one electrical connector mounted to the separator wall.

13. The combination in accordance with claim 12, wherein the separator wall is electrically conductive.

14. A conductor separator in combination with a conductor raceway having a floor and opposing sidewalls forming a raceway passage that is significantly longer than wide, through which at least a first conductor and a second conductor extend longitudinally, and in which there is lateral space for a plurality of additional conductors to extend, the combination comprising:
- (a) a first separator wall extending laterally and contiguously between the raceway sidewalls, the first separator wall having a conductor-supporting surface that divides the raceway passage into an elevated passage and a base passage;
- (b) a second separator wall extending laterally and contiguously between the raceway sidewalls, the second separator wall having a conductor-supporting surface that is aligned substantially along a longitudinal line with the first separator wall's wire-supporting surface in the raceway passage, and wherein the first and second separator walls are spaced longitudinally within the raceway passage for allowing cooling fluid to flow laterally through a longitudinal gap between the first and second separator walls; and
- (c) the first conductor extending longitudinally through the elevated passage and seating against the conductor-supporting surfaces of the first and second separator walls, the second conductor extending longitudinally through the base passage and seating against the raceway floor, thereby forming a gap between the first and second conductors through which cooling fluid can flow laterally and longitudinally.

\* \* \* \* \*